United States Patent [19]

Terry

[11] 4,031,956

[45] June 28, 1977

[54] METHOD OF RECOVERING ENERGY FROM SUBSURFACE PETROLEUM RESERVOIRS

[75] Inventor: Ruel C. Terry, Denver, Colo.

[73] Assignee: In Situ Technology, Inc., Denver, Colo.

[22] Filed: Feb. 12, 1976

[21] Appl. No.: 657,550

[52] U.S. Cl. .................... 166/261; 166/245
[51] Int. Cl.² ........................... E21B 43/24
[58] Field of Search .......... 166/256, 261, 259, 247, 166/263, 294, 245; 165/45

[56] References Cited

UNITED STATES PATENTS

| | | | |
|---|---|---|---|
| 2,390,770 | 12/1945 | Barton et al. | 166/251 |
| 2,497,868 | 2/1950 | Dalin | 166/256 |
| 2,793,696 | 5/1957 | Morse | 166/256 |
| 2,812,161 | 11/1957 | Mayhew | 166/294 X |
| 2,994,376 | 8/1961 | Crawford et al. | 166/256 X |
| 3,000,441 | 9/1961 | Kunetka | 166/261 |
| 3,026,935 | 3/1962 | Allen et al. | 166/256 |
| 3,167,117 | 1/1965 | Santourian | 166/256 X |
| 3,180,411 | 4/1965 | Parker | 166/256 |
| 3,246,693 | 4/1966 | Crider | 166/256 X |
| 3,386,504 | 6/1968 | Kunetka | 166/256 X |
| 3,472,318 | 10/1969 | Woodward | 166/263 X |
| 3,547,195 | 12/1970 | Elkins | 166/261 |
| 3,565,174 | 2/1971 | Parker | 166/261 |
| 3,786,858 | 1/1974 | Potter et al. | 166/247 X |

OTHER PUBLICATIONS

"The Condensed Chemical Dictionary", 6th Edition, Reinhold Publishing Co., N.Y., 1961, p. 1133 relied on.

*Primary Examiner*—Stephen J. Novosad
*Attorney, Agent, or Firm*—Gary M. Polumbus

[57] ABSTRACT

The present invention is directed to a method of recovering energy from a subsurface petroleum formation by igniting the petroleum reservoir and burning as much petroleum as is possible thereby generating heat and recovering the heat so that it can be transformed into other forms of useful energy. The method also includes the steps of controlling the burning reservoir by injecting plugging agents into the more rapidly burning channels of the reservoir and by injecting oxidizing agents in spaced locations from the heat recovery location so that the burn pattern can be spread out over a selected area to maximize the recovery of energy from the selected area.

6 Claims, 5 Drawing Figures

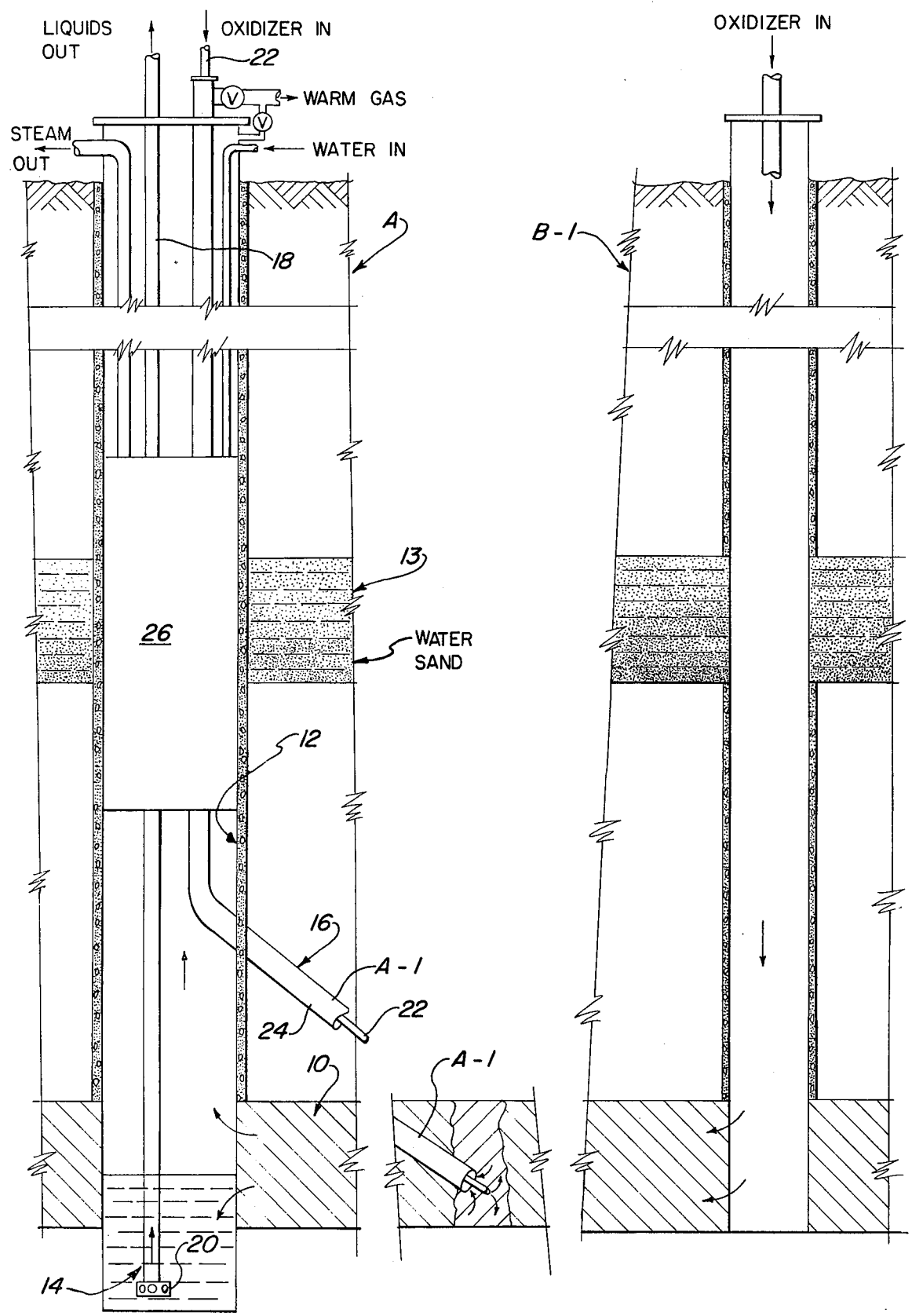
Fig _ 1

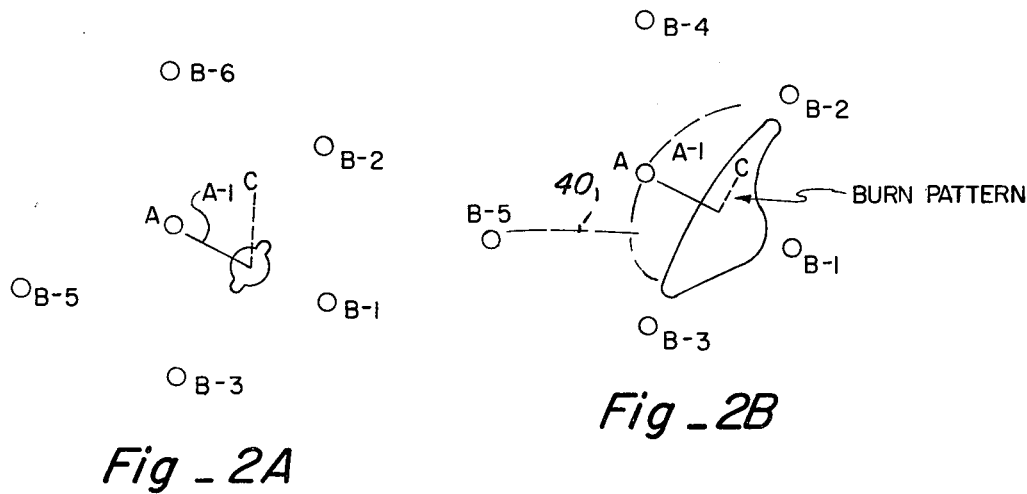
Fig_2A
Fig_2B
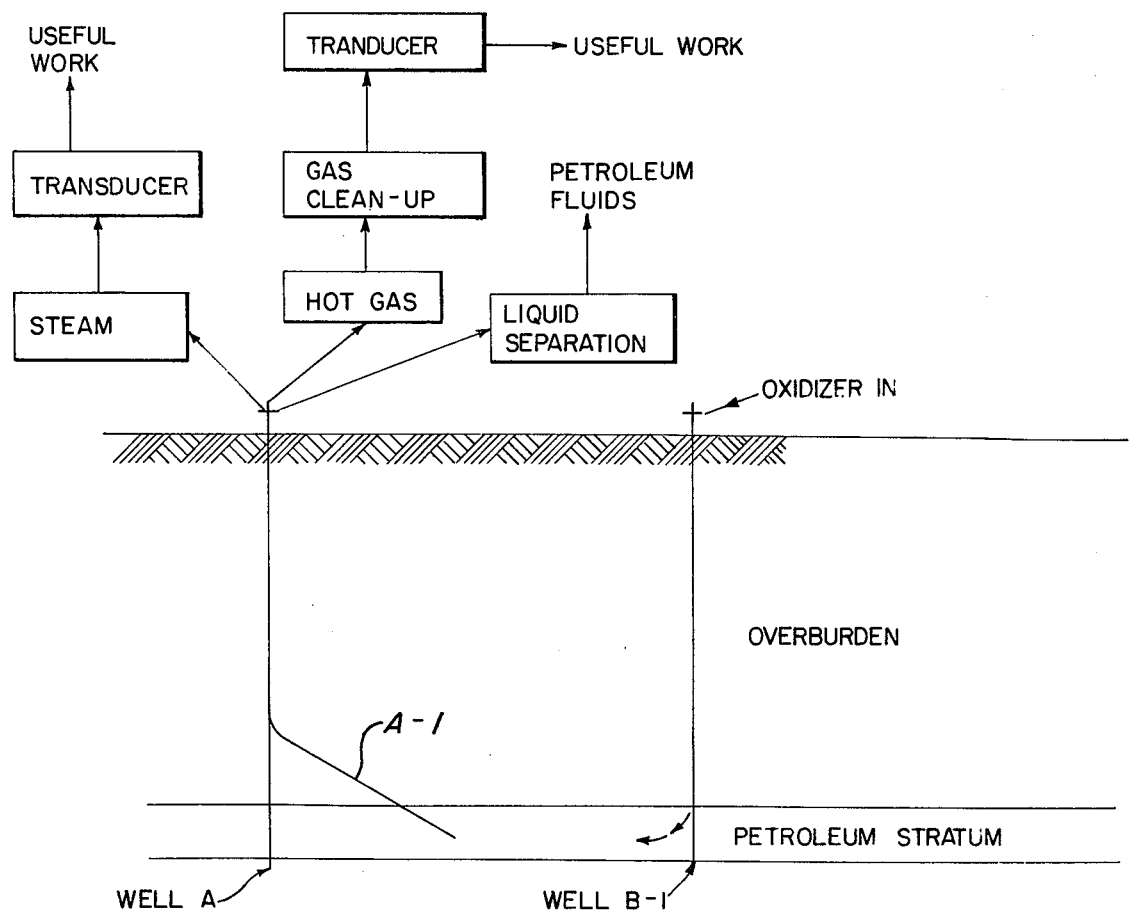
Fig_3

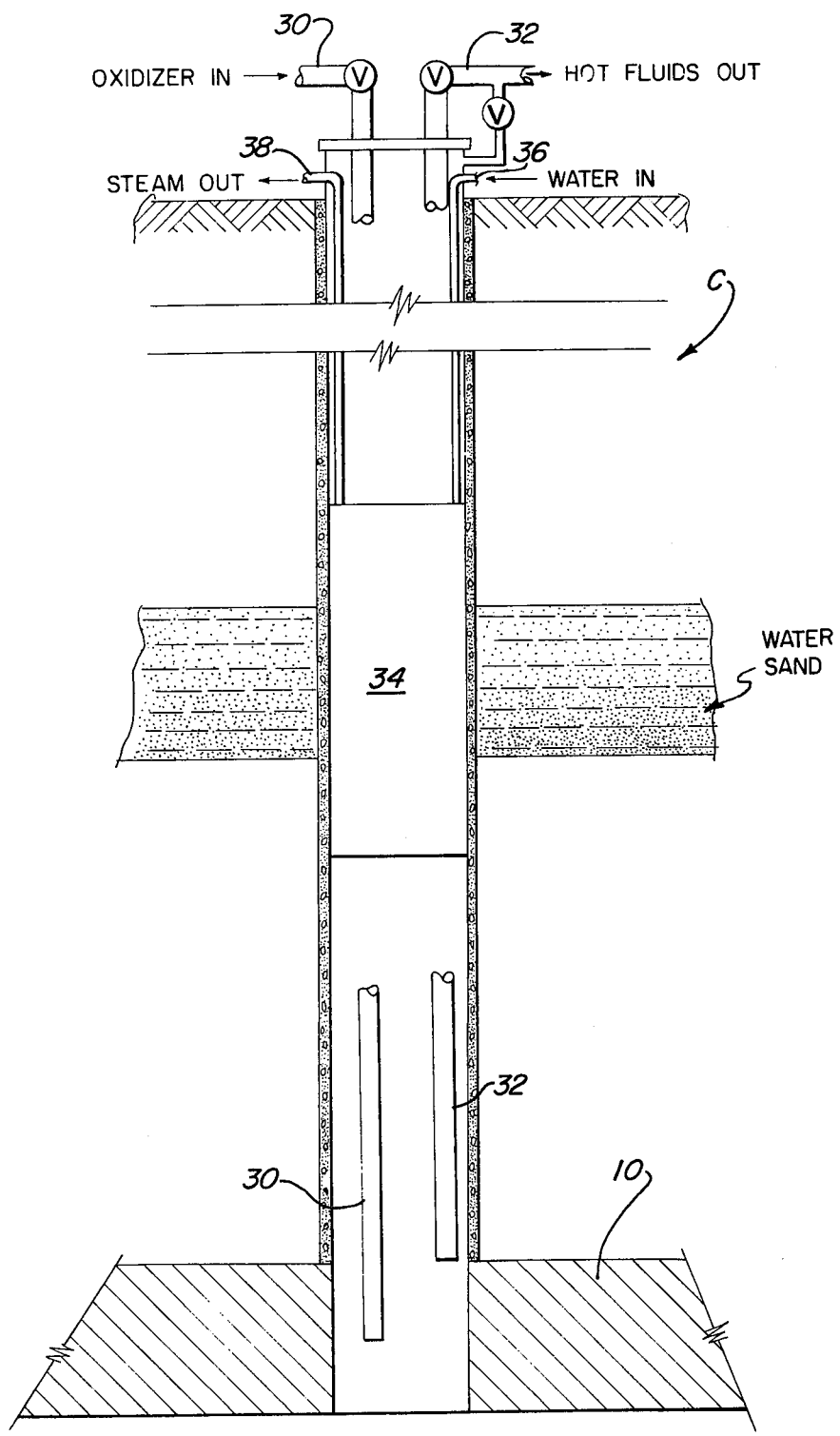
Fig_4

METHOD OF RECOVERING ENERGY FROM SUBSURFACE PETROLEUM RESERVOIRS

BACKGROUND OF THE INVENTION

The present invention relates generally to the production of petroleum in oil reservoirs underground, by extracting the heat values therein and removing the heat for useful work above ground. The method of the invention is particularly well suited in a new utilization of petroleum products remaining underground after a reservoir has been produced to economic depletion by conventional means.

The petroleum industry as we know it today traces its beginning to the Drake well in Pennsylvania, U.S.A., which was brought into production in 1859. Petroleum deposits were known much earlier, with references to bitumen or the like occurring from time to time throughout recorded history. The Drake discovery, the petroleum deposits known earlier, and the discoveries that followed in the early years of the modern petroleum industry, all had one thing in common. They were located in imperfect reservoirs; that is, the reservoirs were leakers resulting in oil seeps at the surface. If the leaks were of recent occurrence, petroleum at the surface would be quite similar to the petroleum underground. If the leaks had been underway for extended periods of time, thus permitting the more volatile constituents of petroleum to escape to the atmosphere, petroleum at or near the surface would be composed of the less volatile constituents such as asphalt, paraffin and the like. It is these latter residuals that found their way into recorded ancient history. Oil seeps lead the early day prospectors, now commonly called wildcatters, to the discoveries of petroleum reservoirs during the latter part of the 19th century and the early part of the 20th century.

There were enough oil seeps around the world to keep the wildcatters busy into the 20th century and a major new industry was established. Eventually, all of the easy to find oil seeps were found and then probed by the wildcatter's bits. More sophisticated methods became necessary and were developed to find likely sites of underground petroleum reservoirs that were not associated with oil seeps. Even to this day, modern technology for finding new reservoirs is such an inexact science that exploratory drilling successes are outnumbered (by several orders of magnitudes) by exploratory drilling failures. Thus, as the quest for new oil proceeds to deeper and deeper targets and to more and more inexcessible location, the cost of finding a new barrel of oil has been steadily rising for many years.

In the early days of the modern petroleum industry, little was known about the reservoir from which the petroleum was withdrawn. Much of the early literature refers to oil "veins", because it was thought that the occurrence of petroleum was analogous to certain types of ore deposits. After many reservoirs had been found, produced and studied, it became apparent that petroleum was, for the most part, accumulated in the pore space of sedimentary rocks. It was also found that the better reservoirs had a considerable amount of pore space and that the pores were interconnected; that is, the host rock was permeable. It was further found that petroleum underground is migratory in nature, and will continue moving until it encounters a barrier to further movement. Once stopped, the fluids underground tend, in time, to separate themselves according to their specific gravities, with natural gas occupying the highest permeable point, underlain by liquid petroleum, with migratory water, if present, underlying the liquid petroleum.

Since sedimentary rocks have their origin in marine environment, all of the original pore space was filled with water. In later geological time, intrusive petroleum displaced much of the water, but in most petroleum reservoirs, a considerable amount of connate water remains. This residual water is located in the smallest of the pore spaces and in areas of lowest permeability. In laboratory simulations above ground, it has been found that the pore space of a reservoir rock must have about 20% oil saturation before any fluid flow occurs. In reservoir conditions underground, it is believed that upwards of 30% oil saturation is required for meaningful fluid flows. Upon inspection of an underground reservoir rock, it is easily ascertained that the pore space linkage forms a multiplicity of natural capillary tubes that further thwart the movement of fluids to a collection point such as an oil well.

Early in modern petroleum history it was recognized that petroleum recovery could be enhanced by outside means. In 1864, for example, U.S. Pat. No. 42,413 was issued to Molyneaux for processes using steam and compressed air in the well bore. Twenty years later, the use of explosives underground was described in U.S. Pat. No. 308,552. As more and more production experience was gained in a variety of petroleum reservoirs, engineering attention was directed to obtaining maximum recovery of petroleum available. Engineering effort in the United States in the early part of the 20th century was relegated to a minor role when one major oil discovery followed another in rapid succession. The lure of quick riches brought all types of individuals into the "oil game" where wild wells or gushers became a symbol of success. Little or no thought was given to irreparable damage being done to the petroleum reservoirs.

Only after corrective legislation at the federal and state levels was enacted and enforced did the petroleum industry return to sound conservation measures. Even when it was many years before the practice of flaring natural gas was brought under control. It was during this period of wasteful practices that hundreds of oil fields were abandoned due to exhaustion of the reservoir pressure, not from lack of oil remaining in the reservoir. Among these abandoned oil fields it is not uncommon to find situations where only 15% of the petroleum was produced and 85% remains locked in place underground.

In recent years attention of the scientist has been directed to the problems of unlocking petroleum underground so that it may be removed to the surface. This effort has been directed both to the abandoned oil field and to prolonging the economic life of currently producing oil fields. The scientist in this field has several economic factors working in his favor, not the least of which is the rising cost of finding new oil. The widely varing physical characteristics from one petroleum reservoir to another preclude a universal solution to the problems. For example, permeability of the pay zone normally will vary considerably from place to place reflecting variations in the original sedimentation process itself. Permeability provides the conduits for the flow of fluids underground and has a direct bearing on the fluid mechanics involved. The viscosity of the petroleum is another critical factor. The more viscous the oil, the greater its resistance to movement under the influence of differential pressure. The oil adsorbed on the pore surfaces underground is difficult to dislodge unless a substitute wetting agent is employed. The oil trapped in capillary tubes underground also is difficult to dislodge unless the capillary forces are altered, and so on.

When the problem of immobility of petroleum underground has been solved, there remains the problem of effecting mobility; that is, moving the petroleum from its diverse locations to collection points for removal to the surface. In almost all cases this requires the restoration of reservoir pressure to somewhere near its original level and in some cases to higher pressures.

The practical scientist, in solving reservoir problems, is guided by economic restraints. The solution of reservoir problems, no matter how ingenious, is an economic failure if the costs of applying the solution exceed the market value of the products recovered. As a practical matter, operating costs must underrun revenues to the extent that a reasonable rate of return is realized on invested capital. This puts the scientist in the posture of adjusting what he would like to do in favor of what he is permitted to do.

Looking to practical solutions the scientist may determine that the primary phase of production did not include an effective water drive. An acceptable solution may be the simple injection of water into the reservoir, thus raising reservoir pressure and providing a water sweep that at its peak performance will yield a barrel of oil for each barrel of water injected. In applying this solution the scientist knows that injected water will not invade all parts of the underground reservoir, and that bypassed oil will remain in place. It is not uncommon to find 50% of the original oil remaining in place after the water flood is completed.

In solving the problems of viscous crude, the scientist knows that the crude oil becomes increasingly more fluid with increases in reservoir temperature. An acceptable solution may be the injection of steam which serves the dual purpose of adding heat and increasing reservoir pressure. In applying this solution the scientist knows that the steam will not invade all portions of the reservoir, and that bypassed oil will remain in place. It is not uncommon to find 70% of the original oil remaining in place after steam treatment is completed.

In another approach to the problems of viscous crude, the scientist knows the crude oil becomes increasingly more fluid if a proper miscible fluid is injected. Useful injection media for this approach include natural gas, various petroleum gases and carbon dioxide. These fluids serve the dual purpose of providing additional reservoir pressure and increasing the fluidity of the crude oil. The scientist knows that upon completion of this approach, substantial quantities of crude oil will remain behind, with 50% of the original oil remaining in place being not uncommon. There is one special case, however, where much greater recovery is attained. This is the case where an abandoned oil field is selected as a storage reservoir in support of a transcontinental natural gas pipeline. In this special case natural gas is pumped into the reservoir during periods of low demand and withdrawn for transmission during periods of high demand, such as during the winter months. During withdrawal, significant amounts of crude oil are produced with the natural gas, and since the natural gas has to be injected and withdrawn for another purpose an unusually high percentage of the crude oil can be recovered over a period of years.

Another problem that plagues the scientist is the differences in mobility between a driving fluid such as water and a driven fluid such as oil. In a waterflood, for example, water tends to move much more rapidly toward the producing well. If there is a significant difference between the fluid movement velocities of water and oil, the water will break through to the removal well, thus passing and bypassing large quantities of oil. This problem can be partially solved by additives that thin the oil or thicken the water, or both.

Still another method of enhancing oil recovery is the so-called fire flood. In this method the oil underground is set afire with combustion sustained by an injected oxidizer such as compressed air. This method provides both reservoir pressure and heat, but only up to 15% of the original oil in place will be consumed by the fire. In practicing this method two types of burns are commonly used. A forward burn occurs when the oxidizer is injected in the well set afire, with products of combustion and fluids (both water and petroleum) being forced radially outwardly from the injection well. Products of combustion and driven fluids are captured in adjacent wells and removed to surface facilities above ground. This method has another advantage for viscous crude oils because the crude nearest the fire reaches cracking temperatures resulting in lighter hydrocarbons that are much more fluid than the original crude. A distinct disadvantage to this process is that crude oil mobilized by the heat encounters the relatively cool reservoir rock ahead, and upon cooling becomes more viscous and plugs the permeable channels.

The second type of burn is the reverse or backward burn, in which a production well is set afire in the pay zone and combustion is sustained by oxidizer injection from one or more nearby wells. By this method the fire front proceeds in the direction of oncoming oxygen, the crude ahead of the fire is cracked in part and in part mobilized by the heat and pressure, then products of combustion together with produced fluids are removed through the production well. Since the crude must pass through the thermal area, a greater amount of cracked products results and the produced crude has a considerably higher API gravity than the original crude. As the fire front moves farther and farther from the production well bore, the permeable conduit for the crude loses heat to the formation and the more viscous constituents of the crude tend to plug the permeability.

During both types of burns when the fluid flows are retarded by viscous petroleum plugging permeable channels, ever increasing injection pressures are required to keep the fluids moving. There is both an economic and a safety limit to the amount of pressure employed. When this limit is reached production ceases and remaining petroleum is left in place. Both burns consume in the fire only up to about 15% of the original petroleum in place. In the burned out areas all of the original water in place is converted to vapor and most of the crude is driven out or consumed by the fire. For crudes that tend to heavy coking some of the crude may remain in the burned out areas in the form of a coke-like solid.

There is one other type of burn that has been tried experimentally and this is the blind hold burn in which a single well is used both for oxidizer injection and for removal of products of combustion and produced fluids. Difficulties encountered in supplying oxygen to a fire that is retreating from the well bore have not been overcome on a commercial basis.

SUMMARY OF THE INVENTION

It is well known in the art how to set petroleum afire underground, how to sustain combustion in each of the modes of burning, how to avoid underground explosions and the like, but the subject invention is concerned with extracting energy values from underground petroleum formations utilizing combustion to an extent which has not previously been possible with known techniques.

A review of the state of the art has shown that the object of previously known petroleum production techniques is to recover petroleum products as liquids, condensible gases and non-condensible gases. It is the primary object of the present invention to recover the energy values from the petroleum in situ and to employ the energy values thus recovered for useful work. Other objects of the invention will become more apparent with the detailed description later.

Upon analysis it can be seen that recovery techniques for petroleum, at best, leave a considerable amount of energy values underground. Only one technique, the fire flood or in situ combustion, results in completely removing all of the petroleum products from a portion of the reservoir. The fire flood is most effective when the crude oil involved, upon being subjected to heat, yields a coke-like residue approximating the amount of fuel necessary for the fire, for example on the order of 15% by weight. In the ideal case the fire consumes the residual coke-like material and drives off petroleum liquids and gases for recovery to the surface, and theoretically removes substantially all of the petroleum from the host rock.

The fire flood is not commercially suitable to all petroleum reservoirs at the present state of the art since the fire flood tends to work best in relatively thin pay sections, for example less than 20 feet in thickness. In all pay sections and particularly the thicker pay sections the fire tends to move in the highest permeable point and proceed laterally in the uppermost portion of the pay section, thus confining the useful effects of the heat to the upper part of the pay section. In this situation the upper part of the pay section is effectively depleted of petroleum while the lower part retains virtually all of the petroleum liquids in place.

The underground petroleum fire is somewhat different from an aboveground fire. Temperatures in an aboveground fire often reach 4000° F with associated flames. Underground the fire in the host rock is limited to the confines of the pore space with the result that there is little or no flame and the maximum temperature normally is on the order of 2000° F. If the underground fire is permitted to encroach into the well bore, space for flames is available, and temperatures approaching that of aboveground fires may result.

Differential temperatures in the reservoir underground are generally advantageous and create no critical operating problems. Differential temperatures in the well bore can be serious operating problems. A fire in the well bore can generate differential temperatures that can destroy casing, tubing, installed equipment and the like. Hot fluids in the well bore can cause destructive expansion of metal parts, breaking the hermetic seal that was established when the well casing was cemented in place, and the like. In steam floods in California, U.S.A., it is not uncommon for the "Christmas Tree" at the top of the casing to be five feet higher above ground after a few hours of steam injection compared to its location prior to steam injection. Similar expansion of metal parts can occur in fire floods when the hot products of combustion transfer heat to the well casing.

Crude petroleum is composed of many hydrocarbon compounds. On a composite weight basis pure crude oil contains approximately 10% hydrogen and 90% carbon. When set afire the hydrogen combines with the oxygen according to the following equation $H_2 + \frac{1}{2} O_2 = H_2O$; carbon combines with oxygen according to the following equation $C + O_2 = CO_2$. When there is insufficient oxygen for complete combustion the following occurs $C + \frac{1}{2} O_2 = CO$, with the carbon monoxide having a calorific content of about 315 BTU per standard cubic foot and the carbon monoxide will burn to $CO_2$ upon encountering sufficient oxygen at a temperature above the ignition temperature.

For in situ consumption of petroleum when all of the available oxygen has been consumed underground by a reaction with hydrogen or carbon, oxidation will cease and the reservoir will no longer burn. In the thermal zone, as long as the temperature is above the ignition point, for example 600° F, the fire will resume when a source of oxygen is added. Fuels for the underground fire include petroleum products (solid, liquid or gas) and carbon monoxide from the products of incomplete combustion.

The following reservoir characteristics are cited as being reasonably typical of petroleum reservoirs that occur in many petroleum provinces of the United States. Data shown is that after the oil field has been abandoned following production by primary methods and secondary recovery by waterflooding:

| Formation | Sandstone |
| --- | --- |
| Depth, ft. | 1200 |
| Pay thickness, net ft. | 20 |
| Porosity, % | 32 |
| Permeability (mD) | 450 |
| Oil remaining, % pore volume | 35 |
| Water (pore volume) | 65 |
| Reservoir Pressure (psig) | 525 |
| Crude gravity, API | 30 |
| Crude viscosity (cp) | 2.0 |

BRIEF DESCRIPTION OF THE DRAWINGS

FIG. 1 is a diagrammatic vertical section illustrating a pair of wells utilized in carrying out the method of the present invention.

FIGS. 2A and 2B are diagrammatic plan views of well patterns illustrating the manner in which the wells cooperate in carrying out the method of the present invention.

FIG. 3 is a diagrammatic vertical section taken through a segment of the earth illustrating a pair of wells cooperating in carrying out the method of the present invention with surface facilities for handling the products of the method.

FIG. 4 is a diagrammatic vertical section taken through a well in the earth which includes means for capturing energy released from a subsurface burning petroleum formation.

DESCRIPTION OF THE PREFERRED EMBODIMENT

This invention in its elementary form comprises at least one injection well and at least one production well, both of which are drilled from the surface of the ground into the oil bearing stratum and are hermetically sealed. In the preferred form of the invention, the object is to consume the petroleum products in situ and to extract useful values in the form of heat and pressure and other forms generally apart from the conventional methods of petroleum recovery. In the preferred form of the method of the present invention, all of the petroleum values are converted to hot carbon dioxide and steam. Connate water is also converted to steam, leaving dissolved solids in place. The resulting hot gases are driven to the production well under the influence of differential pressure and are conveyed to the surface through a well bore. Thus, the energy of the petroleum is converted into sensible heat in fluid form. Aside from heat losses to underground strata, the residual heat is delivered to various apparatus at the surface for conversion into useful work.

Referring to FIG. 1, in the preferred form of the invention, a primary well A is drilled from the surface into and through a petroleum bearing stratum 10. A casing 12 is set in the primary well with the casing being cemented in place to form a hermetic seal and to case off water bearing strata 13 through which the well passes. The bottom of the well is located a sufficient distance below the petroleum bearing stratum 10 to form a sump 14 for collection of liquids. The lower extent of the casing 12 is set a sufficient distance above the bottom of the hole to allow for expansion due to temperature variations. In one form of the invention, the well A is sidetracked as at A-1, in accordance with conventional drilling techniques, so that tubing 16 can be extended through the sidetrack A-1 to permit oxidizer injection and collection of products of combustion at a location spaced from the basic or primary well bore A. In this manner, a fire ignited at the lower end of the sidetrack A-1 is kept away from the basic well bore so that excessive temperatures, for example more than 1,000° F., are avoided at the basic well bore. The primary well A is equipped with liquid return tubing 18, a pump 20 in the liquid collection sump 14 in communication with the liquid return tubing 18, oxidizer injection tubing 22, and gas recovery tubing 24 which are disposed concentrically in the sidetrack A-1, and a heat exchanger 26 positioned in the primary well bore A.

In the preferred embodiment, the heat exchanger 26 is positioned in the primary well bore A so as to control casing temperatures primarily in the vicinity of water bearing strata 13. It is important that the casing and hermetically sealing cement not be subjected to excessively hot temperatures that cause expansion of the casing 12 to the extent of breaking the hermetic seal particularly near water bearing strata as this would allow water into the well bore. The heat exchanger 26, which may be of the type disclosed in my copending application Ser. No. 531,453, is equipped to permit circulation of a heat receptive fluid, for example water, which absorbs heat from hot exit gases and is removed to the surface as a hot fluid, for example steam.

In an alternate embodiment (not shown), the heat exchanger may be two concentric liners of diameters less than the casing so that the temperature of the casing can be controlled from the surface to a convenient point, for example just above the departure of the sidetrack A-1 from the primary well bore A. In this alternate embodiment, the hot gases collected in the primary well A are removed to the surface were particulate matter is removed in a clean-up facility, as will be explained later, and the hot gases are expanded through a transducer also at the surface, for example a turbine that is used to generate electricity. Also in this alternative embodiment, the liners of the heat exchanger could be made of materials that would protect the casing from the hostile environment of temperatures and destructive gases such as free oxygen, sulfur dioxide, and sulfuric acid mist.

In the preferred embodiment, there is at least one primary or production well A and one or more secondary or oxidizer injection wells, for example B-1 through B-5. The preferred arrangement of the wells as is best illustrated in FIGS. 2A and 2B, is to have at least two of the wells, B-2 and B-3, substantially aligned with the primary well so as to lie along the path of maximum permeability of the petroleum reservoir. AT least one other well, such as B-1, is preferably disposed relative to the primary well A along a line substantially perpendicular to the path of maximum permeability. Other wells, such as B-4 and B-5 would peferably be disposed on the opposite side of primary well A from well B-1 along a line generally parallel to a line connecting wells B-2 and B-3. Accordingly, wells B-2 and B-3 would lie in a line with the primary well A which is substantially along the path of maximum permeability of the reservoir, while less permeability would exist between the primary well A and well B-1.

Utilizing the well pattern described and illustrated in FIGS. 2A and 2B, the production cycle of the present invention is initiated by injecting an oxidizer, for example compressed air, into the petroleum stratum through the sidetrack portion A-1 of primary well A and more particularly through the oxidizer injection tubing 22 provided therefor. The petroleum in the stratum is set afire and burns in an outward or forward direction away from the point of ignition, FIG. 2A. In time, for example a few days after ignition, the burn pattern will tend to elongate in the direction of wells B-2 and B-3, since the path of maximum permeability is toward these wells. This burn pattern is illustrated in FIG. 2B. The products of combustion are directed to the surface primarily in the annulus of the sidetracked hole A-1 through the gas recovery tubing 24 after the burn has proceeded a distance, for example 50 feet, from the point of ignition. Before permitting the products of combustion to escape to the surface, oxidizer injection is begun in wells B-1, B-2 and B-3 until the reservoir pressure is significantly increased for example 20% above the pressure at the time of ignition. At this point, the oxidizer injection is terminated in the sidetrack A-1 and the products of combustion are permitted to proceed to the surface through the gas recovery tubing 24 in the sidetrack and through the basic well bore of the primary well A. With oxidizer injection in wells B-1, B-2, and B-3, the burn will continue as a backward burn toward the flow of oxidizer.

As an alternative to the use of a sidetrack portion A-1 of the primary well A, a separate well C, of the type shown in FIG. 4, could be drilled so that the bottom of the well C was located at a point spaced from the primary well A as illustrated in FIG. 2A, e.g. at the same point as the bottom of the sidetrack A-1. In this manner, all of the functions described herein for the sidetracked hole A-1 would be performed through well C and the requirement to sidetrack the primary well would be eliminated. Economics and depth to the petroleum bearing stratum 10 is determinative of whether to sidetrack the primary well or to drill a separate well C. In either case, the well C or the sidetrack A-1 serves as an oxidizer injector, ignition site, re-ignition site when necessary, fluid removal conduit, pressure relief conduit, and the like during various phases of the production cycle. As seen in FIG. 4, well C would be equipped with an oxidizer injection tube 30, a hot fluid removal conduit 32 for the products of combustion, and a heat exchanger 34 through which the hot fluids pass on the way to the surface. A water injection tube 36 to the heat exchanger would be provided as would a steam removal conduit 38 so that heat from the produced fluids could be transferred to the water in the heat exchanger, converting the water to steam which could be used to produce other forms of energy. It may be desirable to have more than one of this type of well in the pattern of wells used to recover the energy values of petroleum in a petroleum bearing stratum.

It is desirable to prevent the burn from reaching the oxidizer injection wells B-2 and B-3 because the objective is to provide a burn front pattern that nears but does not burn through to these oxidizer injection wells. Proximity of the fire may be noted in an oxidizer injection well, such as well B-2, by terminating oxidizer injection in well B-2 and measuring the build-up of carbon dioxide in the well bore. When the burn pattern nears wells B-2 and B-3, for example, approximately 100 feet away, both wells are shut in and oxidizer injection continues through well B-1. At this point in the process, it is desirable to increase the oxidizer injection rate into well B-1. In time, the burn pattern will burn through to well B-1 permitting a substantial increase in oxidizer injection rate through well B-1.

Generally, the burn along a line connecting wells B-2 and B-3 will be inactive, after oxidizer injection through these wells has been terminated, since there is insufficient oxygen available to sustain combustion. The petroleum reservoir rock will normally remain above the ignition temperature of entrained petroleum fluids and therefore, after the burn has penetrated to well B-1, the fire will resume along a line connecting wells B-2 and B-3, due to fewer obstructions to the free flow of oxidizer from well B-1 through the previously burned out area, and will move in a direction toward the primary or production well A. Should the petroleum reservoir temperature drop below the ignition temperature, the fire can be re-ignited by temporary injection of fuel and oxidizer through the sidetrack portion A-1 of the primary well A or through a separate well C.

Upon ignition of the formation along the line connecting wells B-2 and B-3, a line drive fire sweep continues as a forward burn from the oxidizer injection well B-1, with produced fluids being collected and conveyed to surface facilities through the primary well A and sidetrack A-1. Pressure generated in the burn will cause fluids (both water and petroleum) to move ahead of the burn for collection in the primary well. Should the burn area become over-pressurized, pressure relief can be obtained by venting the gases through the sidetrack portion A-1 of the primary well A or a separate well C, whichever may be in use. By holding the proper back pressure at the surface on the primary well A, produced gases may be proportioned for exit to the surface through the basic well bore of the primary well or through the sidetrack portion of the primary well (or through the separate well C), or both.

As the burn proceeds to sweep in the direction of well A, in time the pattern will tend to bulge toward well A. Continuing the burn sweep in a reasonably straight line can be accomplished by injecting oxidizer in wells B-4 and B-5 and other wells not shown which would lie on lines parallel to a line connecting wells B-4 and B-5 but being further removed from well A than wells B-4 and B-5. In this mode, the burn will proceed as a forward burn from well B-1 and a reverse burn from wells B-4 and B-5 or other wells further aong the direction of the burn. In this method, the pattern of the burn can be controlled so that substantially all of the petroleum values can be consumed in the fire, effectively cleaning the reservoir of petroleum originally locked in place. Accordingly, where prior art systems have not been capable of consuming any more than approximately 15% of the petroleum in place, the method of the present invention can remove up to 100% of the petroleum in place.

Should the variations in formation permeability be such that inadvertent burn-through occurs, for example a channel 40 to well B-5, the controlled flow of fluid underground is hampered due to excessive permeability between two points. Permeability to the desired levels can be restored by terminating oxidizer injection in well B-5 and injecting a plugging substance through well B-5 into the burned out channel. In this manner, excessive permeability is plugged so that fluid flows may be resumed through other portions of the formation.

The plugging substance should be one that will effectively plug the open channels. While there are many substances capable of plugging permeability, for example cement or other thermal setting materials, the preferred substance is one that is also consumable by fire, but with a slower burn rate than the entrained petroleum. For this purpose, gilsonite is preferably used. It is melted and injected as a liquid at an appropriate temperature, for example 500° F. Gilsonite congeals at about 250° F. and has an exothermic point at about 680° F. If the permeable channels are below 250° F., gilsonite will plug the permeability by freezing. If the formation temperature is above 680° F., as it would be when injected gilsonite reaches the fire area, gilsonite de-composes partly into flammable fluids and partly into green coke. The coke content of decomposed gilsonite can be almost 50% by weight, and the green coke will plug excessive permeability. The flammable portion of the gilsonite can be consumed by the fire for recovery in the form of heat from the system. The coke portion of the gilsonite serves first as a plugging substance which may eventually be consumed by the fire near the end of the burn sweep system.

Gilsonite is the preferred plugging agent but other hydrocarbons could be used. In all cases, the desired result is to plug the more permeable channels so that fluid movement can be obtained in the lesser permeable channels. By repeating plugging treatments, petroleum in the less permeable areas can be consumed in the fire and be recovered for its heat value.

In addition to plugging channels of permeability, it may also be desirable to control the burn pattern by pressure differentials of non-flammable fluids. Referring to FIG. 2B, if it is desirable to prevent the burn pattern from encroaching into wells B-2 and B-3, a non-flammable gas such as carbon dioxide can be injected into wells B-2 and B-3, at a pressure slightly higher than the pressure in the burn area, thus blocking the burn toward wells B-2 and B-3.

Likewise, it may be desirable to have the burn move in the direction of maximum permeability in the petroleum bearing stratum. This can be accomplished by reorienting the geometric pattern of the wells and following methods of burn control described above.

Referring to FIG. 3, a schematic representation has been made of facilities at the surface to handle the products of the aforedescribed method so that the products can be converted into a useful form of energy. The facilities are preferably near the primary well A, and the production well C if a sidetrack is not utilized. The facilities would include a conventional liquid separation system for treating liquids produced during the combustion of the petroleum reservoir which liquids were transported to the surface from the sump 14 by the pump 20. As a result of the liquid separation, petroleum fluids are produced in liquid and gaseous form as in conventional production of petroleum reservoirs. Also at the surface, would be a facility for receiving hot gases produced during the combustion of the petroleum reservoir and for transferring the hot gases from this facility to a conventional gas clean-up facility and ultimately utilizing the exit gas from the clean-up facility to operate a transducer to produce other forms of energy such as electricity or the like. Facilities would also be provided for capturing steam emanating from the heat exchanger in the well bore and directing this steam into a transducer, such as a turbine, so that other forms of energy, such as electricity, could be generated by the transducer.

As will be appreciated, the petroleum in the reservoir, by utilizing the process of the present invention, can be completely removed from the reservoir in the form of liquids and gases as these liquids and gases are released from the reservoir primarily due to the heat from combustion, or the heat generated in the combustion can be captured in the heat exchanger and converted to another form of energy so that various energy forms are created while totally depleting the petroleum products from the reservoir rock. As mentioned previously, other methods of recovering petroleum products from reservoir rock have not to-date been capable of completely depleting the reservoir of the petroleum products but rather have only depleted very small percentages, for example 15%, leaving the remaining petroleum products in the reservoir.

While the instant invention has been described with a certain degree of particularity, those skilled in the art will be able to envision other embodiments within the spirit of the disclosure.

I claim:

1. A method of extracting heat from a petroleum reservoir in the earth by consuming the petroleum in situ comprising the steps of:
   establishing at least two injection passages and a removal passage between a surface location and the petroleum reservoir,
   injecting an oxidizer through one of the injection passages into the petroleum reservoir,
   igniting the petroleum reservoir through said one passage to create a fire front which progresses toward the other of said injection passages,
   injecting an oxidizing agent into said other injection passage while maintaining the injection through said one injection passage,
   allowing channels to be formed in the petroleum reservoir by burning petroleum,
   injecting a plugging agent into the most rapidly forming channels,
   controlling oxidizer injection so that petroleum is consumed in the fire,
   collecting fluids produced by the burning petroleum in the removal passage,
   conveying the fluids through the removal passage to the surface location, and
   forming an underground burn pattern by injection of a non-flammable fluid into the reservoir at locations where it is desired to discourage further burning.

2. The method of claim 1 wherein said fluids produced by the burning petroleum are passed through heat exchange means located in the said removal passage as they are removed from the reservoir and further including the step of circulating a heat receptive fluid from a surface location through the said heat exchanger means and back to a surface location.

3. The method of claim 1 wherein the plugging agent decomposes into coke residue when its temperature is increased significantly.

4. The method of claim 1 wherein the plugging agent is flamable but burns at a slower rate than the petroleum.

5. The method of claim 1 wherein the petroleum reservoir has a pattern of maximum permeability extending along a substantially straight path in opposite directions from said removal passage and wherein there is at least one of said injection passages along said path on each side of said removal passage.

6. The method of claim 5 wherein there is at least one of said injection passages spaced from said removal passage along a path substantially perpendicular to said pattern of permeability path.

* * * * *